(12) United States Patent
Ortman et al.

(10) Patent No.: US 8,794,394 B2
(45) Date of Patent: Aug. 5, 2014

(54) ELECTRIC BRAKE SYSTEM WITH FLEXIBLE FORCE TRANSFER MEMBER

(75) Inventors: Michael J. Ortman, Springfield, NJ (US); Steven Anderson, Upper Saddle River, NJ (US); Eric Schwaigert, South Burlington, VT (US)

(73) Assignee: Goodrich Corporation, Charlotte, NC (US)

( * ) Notice: Subject to any disclaimer, the term of this patent is extended or adjusted under 35 U.S.C. 154(b) by 951 days.

(21) Appl. No.: 12/088,503

(22) PCT Filed: Sep. 29, 2006

(86) PCT No.: PCT/US2006/037827
§ 371 (c)(1),
(2), (4) Date: Mar. 28, 2008

(87) PCT Pub. No.: WO2007/041200
PCT Pub. Date: Apr. 12, 2007

(65) Prior Publication Data
US 2008/0245625 A1   Oct. 9, 2008

Related U.S. Application Data

(60) Provisional application No. 60/721,718, filed on Sep. 29, 2005.

(51) Int. Cl.
*F16D 55/08* (2006.01)
*F16D 65/14* (2006.01)

(52) U.S. Cl.
USPC ..................................... 188/72.1; 188/204 R

(58) Field of Classification Search
CPC . F16D 2125/60; F16D 2125/62; F16D 25/18; F16D 2121/24; F16D 2055/0091; B60T 11/06

USPC ............ 188/72.1–72.9, 2 D, 156, 162, 106 R, 188/204 R, 217

See application file for complete search history.

(56) References Cited

U.S. PATENT DOCUMENTS 2,938,607 A * 5/1960 Kershner et al. ............. 188/72.8
3,425,519 A * 2/1969 Frigger ......................... 188/72.3

(Continued)

FOREIGN PATENT DOCUMENTS

DE      39 35 425 A1    4/1991
DE      3935425     *   4/1991

(Continued)

OTHER PUBLICATIONS

International Search Report of International Application No. PCT/US2006/037827, published as International Publication No. WO 2007/041200 on Apr. 12, 2007.

(Continued)

*Primary Examiner* — Vishal Sahni
(74) *Attorney, Agent, or Firm* — Snell & Wilmer, L.L.P.

(57) ABSTRACT

A brake assembly and system (202) characterized by the use of a flexible force transfer member (230) to enable an electric motor (220) to be mounted remotely from other brake components and preferably at a location shielded from the elements and/or more easily accessible for maintenance and repair. By mounting the electric motor (220) in a less confining area, and using a force distribution device (350) to distribute force to a plurality of rams (342,344), one larger motor (220) may be used to drive multiple disk engagement members rather than several smaller motors mounted on the brake assembly. Since larger motors are typically more efficient than smaller motors, using one larger motor increases the overall efficiency of the brake.

13 Claims, 3 Drawing Sheets

(56) References Cited

U.S. PATENT DOCUMENTS

| | | | | |
|---|---|---|---|---|
| 4,372,427 | A | * | 2/1983 | Rogier ................... 188/72.1 |
| 4,381,049 | A | | 4/1983 | Crossman |
| 4,432,440 | A | | 2/1984 | Crossman |
| 4,542,809 | A | | 9/1985 | Crossman |
| 4,567,967 | A | | 2/1986 | Crossman |
| 4,596,316 | A | | 6/1986 | Crossman |
| 4,865,162 | A | | 9/1989 | Morris et al. |
| 5,586,474 | A | * | 12/1996 | Lund ........................ 81/57.3 |
| 5,769,189 | A | * | 6/1998 | Heibel et al. ............... 188/156 |
| 6,095,293 | A | * | 8/2000 | Brundrett et al. ........... 188/72.1 |
| 6,213,564 | B1 | * | 4/2001 | Face, Jr. ..................... 303/3 |
| 6,581,730 | B1 | | 6/2003 | Haydon et al. |
| 6,615,958 | B1 | * | 9/2003 | Baden ..................... 188/264 AA |
| 7,219,772 | B2 | * | 5/2007 | Bieker et al. .............. 188/1.11 L |
| 2006/0102436 | A1 | * | 5/2006 | Haydon et al. ............. 188/72.7 |

FOREIGN PATENT DOCUMENTS

| | | | |
|---|---|---|---|
| WO | WO 01/20188 | * | 3/2001 |
| WO | WO0214127 | * | 6/2002 |
| WO | 03/056209 A1 | | 7/2003 |

OTHER PUBLICATIONS

EP; Examination Report dated Mar. 31, 2010 in Application No. 06815658.7.

PCT; International Preliminary Report on Patentability dated Jan. 2, 2008 in Application No. PCT/US2006/037827.

* cited by examiner

ELECTRIC BRAKE SYSTEM WITH FLEXIBLE FORCE TRANSFER MEMBER

RELATED APPLICATION DATA

This application claims priority of U.S. Provisional Application No. 60/721,718 filed Sep. 29, 2005, which is hereby incorporated herein by reference.

This application is a national phase of International Application No. PCT/US2006/037827, filed Sep. 29, 2006, and published in the English language under WO 2007/041200 A1.

FIELD OF THE INVENTION

The invention herein described relates generally to brakes and methods, more particularly to brakes and methods using electromechanical actuators, and still more particularly to electrically actuated aircraft brakes and methods.

BACKGROUND OF THE INVENTION

Aircraft wheel and brakes heretofore have included a non-rotatable wheel support, a wheel rotatably mounted to the wheel support, and a brake disk stack having alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head may house a plurality of actuator rams that extend to compress the brake disk stack against the back plate. Torque is taken out by the stator disks through a static torque tube or other torque take-out means.

Electrically actuated aircraft brakes of various configurations are known, as exemplified by U.S. Pat. Nos. 4,381,049, 4,432,440, 4,542,809 and 4,567,967. The brakes shown in these patents include electric motors that respond to an electrical control signal to effect rotation of a ring gear member that interacts through a plurality of balls to drive a linearly movable ram member into contacting engagement with a brake disk stack to effect compression thereof and braking of a wheel.

In U.S. Pat. No. 4,596,316, another configuration of an electrically actuated brake uses a roller screw drive wherein a ring gear member interacts through a plurality of roller screws to drive a ram member into engagement with a brake pressure plate to effect compression of the brake disk stack for braking action. A plurality of electric motors and their associated pinions drive the ring gear to effect linear axial movement of the ram member.

In U.S. Pat. No. 4,865,162, a further electrically actuated aircraft brake employs a roller screw drive mechanism driven by an electric torque motor through a gear drive associated with either the screw or the nut of the roller screw drive mechanism. Rotation of the gear drive by the torque motor moves the other one of the screw or nut into axial engagement with a brake disk stack to compress the stack for braking. A plurality of the roller screw drive mechanisms and respective gear drives and torque motors are assembled in a brake head in a balanced arrangement about the axis of the wheel to apply and release a brake pressure force on the brake disk stack in response to an electrical control signal to the torque motors.

More recently, aircraft brake assemblies have been proposed wherein the actuator portion of the brake assembly is no longer provided as part of the brake assembly but instead as part of the aircraft landing gear. This enables quick and easy replacement of the actuator modules without requiring disassembly of the overall brake and wheel assembly. Such an assembly is disclosed in U.S. Pat. No. 6,095,293.

However, because the brake assemblies of the presently known brakes are mounted on the landing gear or wheel support of a vehicle, they and the components thereof are directly exposed to the elements (temperature, precipitation, etc.). Exposure to the elements can accelerate the need for maintenance and repair of the brake assembly.

SUMMARY OF THE INVENTION

The present invention provides a brake assembly and system characterized by the use of a flexible force transfer member to enable an electric motor to be mounted remotely from other brake components and preferably at a location shielded from the elements and/or more easily accessible for maintenance and repair. Also, by mounting the electric motor in a less confining area, and using a force distribution device to distribute force to a plurality of rams, one larger motor may be used to drive multiple disk engagement members rather than several smaller motors mounted on the brake assembly. Since larger motors are typically more efficient than smaller motors, using one larger motor increases the overall efficiency of the brake.

Accordingly, a preferred embodiment of a brake according to the present invention comprises a brake disk, at least one disk engaging member for applying braking force, an electric motor, and a flexible force transfer member connecting the motor to the at least one disk engaging device. In accordance with the invention, the electric motor is mountable separate and apart from the brake assembly.

According to another aspect of the invention, there is provided a brake system characterized by the use of a force distribution device for distributing force from the electric motor to a plurality of rams for applying braking force to the brake disk. A flexible force transfer member connects the electric motor to the force distribution device thereby enabling the electric motor to be mounted separate and apart from the brake assembly. By mounting the electric motor in a less confining area, and using a force distribution device to distribute force to a plurality of rams, one larger motor may be used to drive the multiple disk engagement members rather than several smaller motors mounted on the brake assembly.

In a preferred application, the brake is used in combination with an aircraft wheel assembly, and the flexible force transfer member is a flexible cable, in particular a steel flexible cable that is less susceptible, relative to previously used electric wiring, to damage from foreign objects both on the runway and in the air.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Because the invention was conceived and developed for use in an aircraft braking system, it will be herein described chiefly in this context. However, the principles of the invention in their broader aspects can be adapted to other types of braking systems.

Conventional electrically actuated braking systems comprise a brake disk mounted to a wheel for rotation therewith and an electrically actuated disk engaging member. Typically, an electric motor is used to supply force to the disk engaging member to apply a clamping force to the brake disk to effect a braking action. More typically, the electric motor and disk engaging member is combined into an electromechanical actuator that is mounted to a brake head or other support for engaging the brake disk. An example of such electrically actuated brake systems can be found in U.S. Pat. No. 6,095,293. However, in contrast to conventional electrically actuated braking systems, the current invention allows the electric motor or motors to be mounted remotely from the other braking components, and one electric motor may drive more than one disk engaging device.

Figure 1:
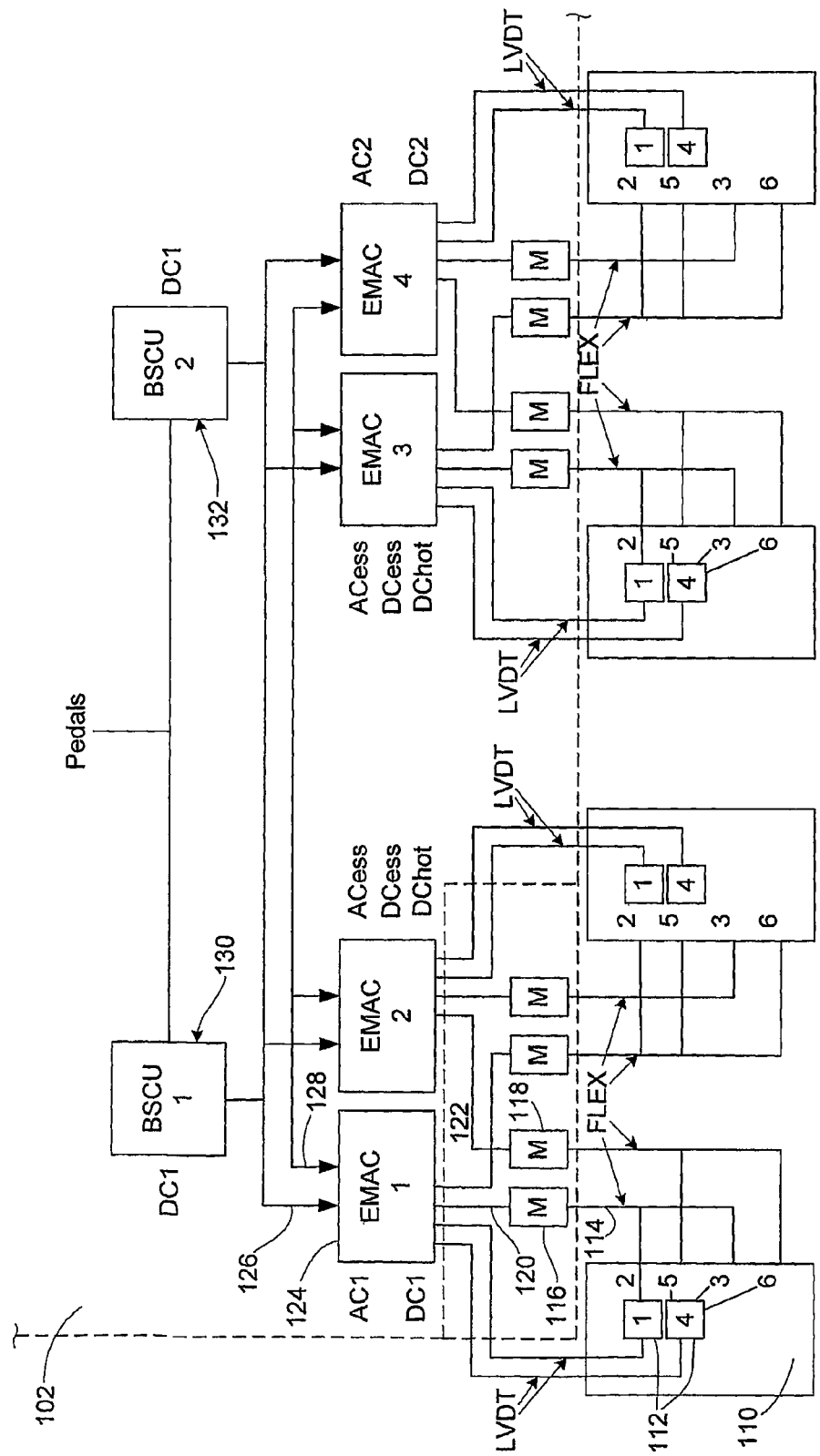
FIG. 1 is a schematic illustration of an exemplary aircraft brake system according to the invention.

Referring now in detail to the drawings, and initially to FIG. 1, a brake system according to the present invention in combination with an aircraft is generally indicated at 102. The brake comprises a wheel and brake disk assembly 110, six disk engaging members 112, and flexible force transfer members 114 connecting two electric motors 116 and 118 to the disk engaging members 112. The motors 116 and 118 each have extending therefrom a respective cable 120, 122 for effecting electrical connection to an electro-mechanical actuator controller 124 (EMAC) that may include a corresponding number of independent servo amplifiers, a microprocessor with associated peripherals, and data input/output (I/O) circuitry. The EMAC 124 is connected via cables 126 and 128 to two brake system control units 130 and 132 (BSCU). Details of the EMAC 124 and BSCUs 130,132 are not being described herein as the invention does not reside in the type of controller or other circuitry used to control operation of the actuator modules.

In the illustrated braking system, the two electric motors 116 and 118 drive a total of six disk engaging members 112 per wheel. Each electric motor is connected to three disk engaging members 112 via flexible force transfer members 114. While the illustrated embodiment shows one flexible force transfer member 114 extending from each electric motor to three disk engaging members 112, it will be understood that any number of electric motors, flexible force transfer members, and disk engaging members could be used. For example, three separate flexible force transfer members could be used to connect three disk engaging members 112 to one electric motor 116.

Preferably, the flexible force transfer member 114 is a flexible cable. In the illustrated embodiment, the flexible cable transfers torque from the electric motor 116 to the three disk engaging members 112. The disk engaging members 112 include reciprocating rams, preferably employing a ball screw or other device that translates rotational motion to linear motion. In a preferred embodiment the flexible cable is a rotary cable which may include a rotating inner cable and an outer protective non-rotating sheath.

In a particular embodiment, the reciprocating rams are included in ram modules, also shown at 112, mounted to the brake head by removable bolt fasteners or other suitable means enabling quick and easy attachment and detachment of the ram modules to and from the brake head. As shown in FIG. 1, six ram modules 112 are mounted in a circular arrangement around the rotational axis of the wheel, preferably circumferentially equally spaced apart. The ram modules 112 each have connected thereto a force transfer member 114 that transfers force to the ram module 112 for effecting a braking action.

The modules 112 may be identical and interchangeable. Each module 112 may include a gear train that provides desired gear reduction, a coupling for connection to the end of a flexible cable, and a ball screw assembly (or other rotary to linear motion conversion device) which converts rotary motion to linear motion of a ram member. The gearing and ball screw assembly may be carried in a module housing. The coupling (input) for receiving force from an external source is accessible from outside the housing of the module. Preferably, most of the gear reduction between the motor and actuator rams is effected in the brake actuator module thereby minimizing the amount of torque that is transferred by the flexible cable, and thus minimizing the diameter and weight of the flexible cable needed to drive the actuator ram.

An example of a gear and ball screw assembly is disclosed in U.S. Pat. No. 6,095,293, which is hereby incorporated herein by reference. Accordingly, the gearing may include a pinion, a transfer gear and a screw gear formed integrally with the ball screw of the ball screw assembly (although reference herein is made to certain structures as being integral as is preferred, it should be understood such structures alternatively may be composed of discrete components joined together to form a functionally equivalent structure). The transfer gear may be journalled by bearings between the outer and inner housing members and in mesh with the pinion and the screw gear. The transfer gear may be realized by a plurality of gears that mesh to transmit torque and provide the desired gear ratio from the pinion to the screw gear. The ball screw assembly may be comprised of the ball screw with the integral gear, a hexagonal ball nut that translates rotary motion to linear motion of the ball nut, and a ram pad that attaches to the end of the ball nut and provides an insulating interface with the brake disk stack. The ball screw and ball nut may be of a known configuration and thus the respective spiral grooves thereof and associated balls have not been illustrated as the same would be immediately evident to one skilled in the art. Also, other rotary to linear motion conversion devices may by employed, if desired, with the linear moving member coinciding with the ball nut and functioning as the actuator ram. The ball nut (also herein referred to as a ram or ram nut) may be free to translate along the axis of the ball screw upon rotation of the ball screw, but not to rotate, as the ball nut is guided by a bore in a nut slider.

The electric motor 116 may be mounted in a plurality of locations. In the illustrated embodiment, the electric motor 116 is mounted remotely from the ram modules 112 and other brake components. The location of the electric motor 116 is preferably in a position shielded from the elements and/or more easily accessible for service and repair, such as in the landing gear well of an aircraft. However, it will be understood by those skilled in the art that the electric motor 116 may be mounted at any location subject only to the limitations of the flexible force transfer member.

The electric motor 116 may be a DC brushless servo motor. The brushless DC servo motor 116 may contain, in addition to its motor components, an integral friction type, electrically actuated brake, and a resolver for motor rotor commutation and angular velocity sensing. The resolver may be used to provide motor position feedback and velocity information. The brake may be a power-on type or a power-off type, as desired for a particular application. The specific motor selection will be dependent on the requirements for a given braking application.

Figure 2:
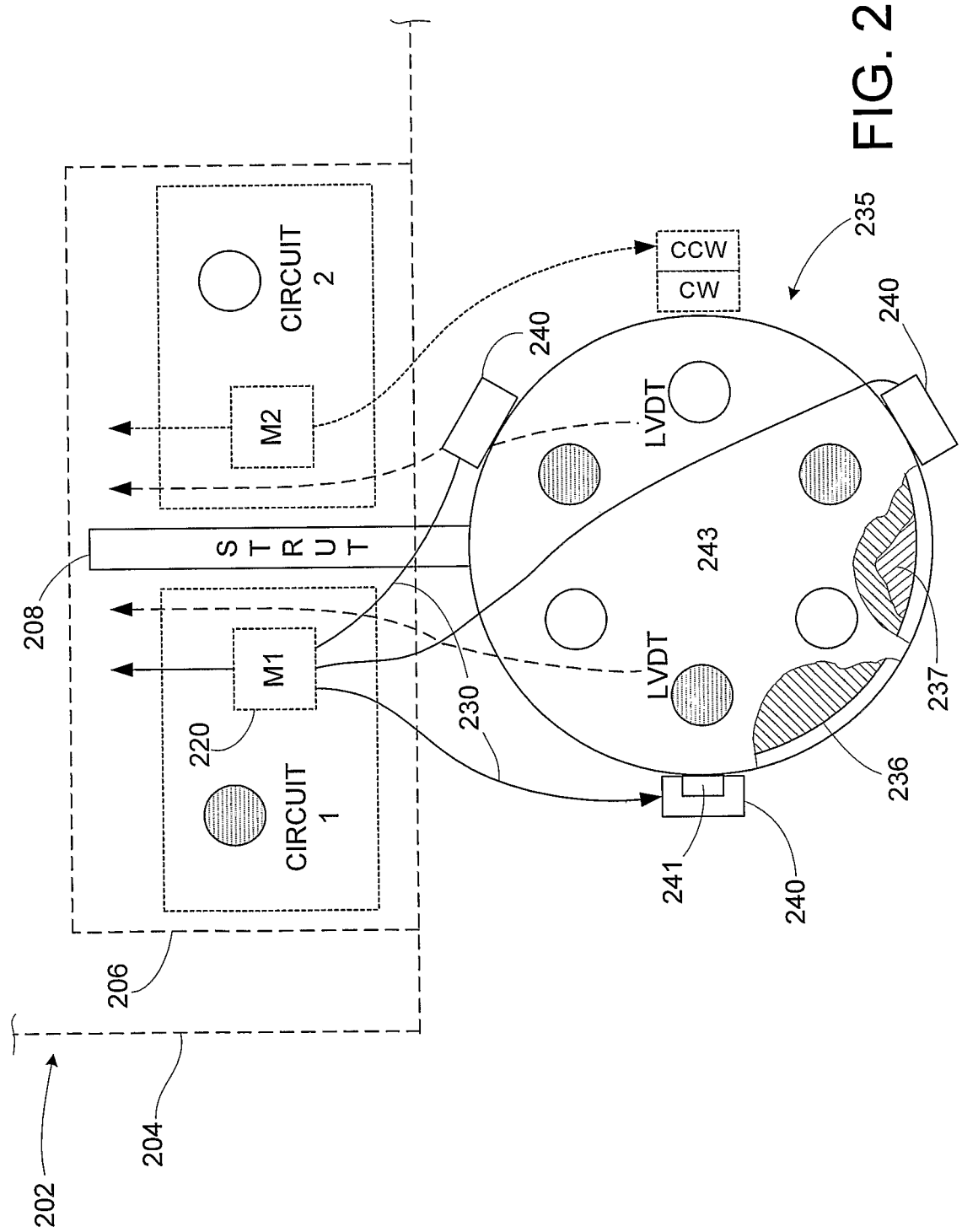
FIG. 2 is a schematic illustration of the brake system of FIG. 1.

Referring now to FIG. 2, the present invention is shown in combination with an aircraft's landing gear. The aircraft brake system 202 comprises an aircraft frame 204, a wheel well 206, and a wheel support 208 mounted to the frame 204 in the wheel well 206. A wheel (not shown) is rotatably mounted to the wheel support 208 and a brake stack assembly 235 having interleaved stator 236 and rotor disks is shown. The brake stack assembly 235 may be any conventional brake stack such as the brake stack disclosed in U.S. Pat. No. 6,581,730.

As one of skill in the art will appreciate, system redundancy for aircraft controls is commonplace. Accordingly, the illustrated embodiment contains two independent brake systems according to the present invention, wherein either system may operate alone to effect a braking action. Since each system is identical in the illustrated embodiment, the following discussion will relate to a single brake system but it will be understood that any number of independent brake systems may be utilized depending on the desired level of redundancy.

An electric motor 220 is mounted to the aircraft frame 204 in the wheel well 206 independently of the wheel support 208. A flexible force transfer member 230, preferably a flexible cable, operatively connects the electric motor 220 to a disk engaging member 240 (e.g., a ram module).

The flexible cable 230 enables the electric motor 220 to be mounted remotely yet remain operably connected to the disk engaging member 240. Further, because the flexible cable 230 is flexible, the electric motor 220 and the disk engaging member 240 may move relative to each other and remain operatively connected. For example, in FIG. 2, relative motion may occur between the electric motor 220 and the other brake components such as during extension and retraction of the strut 208, or during deployment or stowing of the landing gear in the wheel well. The flexible cable 230 flexes and remains operatively connected to the disk engaging member 240 and electric motor 220.

As stated, the brake stack assembly 235 may be any conventional brake stack assembly. As is conventional, the brake stack assembly 235 may include a brake head and a back pressure member between which the disk stack is situated. Pressure is applied to the front end of the disk stack by one or more disk engaging members 240. In the illustrated embodiment, the disk engaging members 240 include reciprocating rams 241 included in the ram modules, also denoted as 240, mounted to a brake head 243 by removable bolt fasteners or other suitable means enabling quick and easy attachment and detachment of the ram modules 240 to and from the brake head. As shown in FIG. 2, a plurality of ram modules 240 may be mounted in a circular arrangement around the rotational axis of the wheel, preferably with the reciprocating rams 241 circumferentially equally spaced apart.

Preferably, the ram modules 240 are identical and interchangeable, and a representative one of the ram modules 240 is shown somewhat schematically in FIG. 2. Each ram module 240 may be as above described.

As stated, a flexible force transfer member, preferably a flexible cable 230, operatively connects the electric motor 220 to a ram module 240. A person of skill in the art will now recognize that the flexible cable 230 transmits torque from the electric motor 220 to the ram module 240 via the ram module's input for receiving force from an external source. Thus, in the illustrated embodiment, the electric motor 220 is the external source of force. The flexible force transfer member 230 enables the electric motor 220 to be mounted remotely from the ram module 240, preferably on the aircraft frame 204 independent of the wheel strut 208 in a location shielded from the elements and/or more easily accessible for maintenance or repair.

Figure 3:
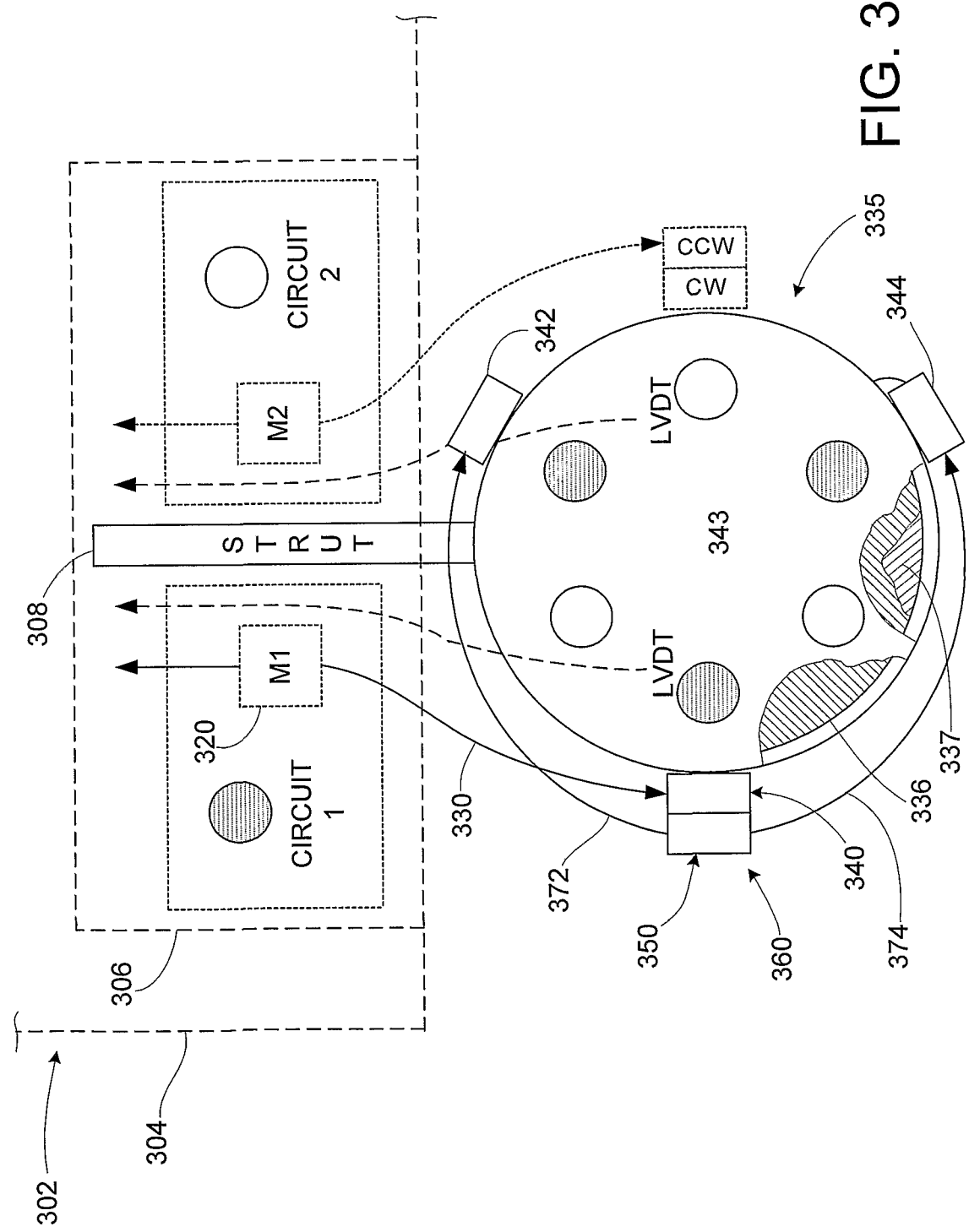
FIG. 3 is a schematic illustration of another embodiment of brake system according to the invention.

As shown in FIG. 3, a brake according to another embodiment of the present invention is shown at 302 in combination with an aircraft's landing gear. The aircraft brake comprises an aircraft frame 304, a wheel well 306, and a wheel support 308 mounted to the frame 304. A wheel (not shown) is rotatably mounted to the wheel support 308 and a brake stack assembly 335 comprising interleaved stator 336 and rotor 337 disks is shown. The brake stack assembly 335 may be any conventional brake stack such as the brake stack disclosed in U.S. Pat. No. 6,581,730. A force distribution device 350 is shown mounted to the a brake head 343 and operably connected to the electric motor 220 via a primary flexible force transfer member.

In one particular embodiment, the force distribution device is mounted directly to a ram module 340, thereby forming a master ram module 360. The master ram module 360 distributes the force received from the electric motor 320 via the primary force distribution member 330 to two additional ram modules 342, 344 via two secondary force transfer members 372, 374. The master ram module 360 may be connected to the other ram modules 342, 344 via two flexible force transfer members and thus may be mounted anywhere that the electric motor 320 could otherwise be mounted. For example, the force distribution device 350 may be mounted remotely to the aircraft frame 304 along with the electric motor 320. However, in the preferred embodiment, the FDD 350 is mounted to brake stack 340 and distributes force equally between the module to which it is mounted and one or more additional ram modules 340, 342, 344.

The master ram module 360 comprises a force distribution device 350 mounted to a ram module 340. The force distribution device 350 comprises an input port for receiving force from an external source, a plurality of gears for dividing the force and/or reducing the force, and two output ports for transferring force to the other ram modules 342, 344 via secondary force transfer members 372, 374. In the preferred embodiment, the force distribution device 360 receives torque from the electric motor 320 via the primary flexible force transfer member 330 and divides the force equally according to the number of ram modules to which it will transfer force. The ram module 340 to which the force distribution device 350 is mounted receives force directly from the force distribution device 350. The remaining ram modules 342 and 344 are connected to the force distribution device 350 via secondary force transfer members, preferably flexible cables. However, the ram modules 342 and 344 may also be operatively connected to the force distribution device 350 by one or more rigid force transfer members such as a ring gear assembly or other rigid force transfer member.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. An aircraft brake system comprising
an aircraft brake disk mounted proximate to a first portion of a strut;
a master ram module positioned to apply braking force to the aircraft brake disk;
a second ram module positioned to apply braking force to the aircraft brake disk;
an electric motor for actuating the master ram module and the second ram module mounted directly on a landing gear well proximate to a second portion of the strut, the first portion of the strut opposite the second portion of the strut when the strut is in a deployed position;
a first cable connecting the electric motor to a gearbox for transferring an input force from the electric motor to the gearbox, wherein the gearbox is mounted to the master ram module, the gearbox comprising a plurality of gears to reduce input force, wherein the gearbox distributes force equally between the master ram module and the second ram module, wherein the gearbox transfers a first force from the gearbox directly to the master ram module; and
a second cable for transferring a second force from the gearbox to the second ram module, the second cable connecting the gearbox to the second ram module.

2. The aircraft brake system as set forth in claim 1, wherein the brake disk includes a brake disk stack comprising alternating rotors and stators.

3. The aircraft brake system as set forth in claim 1, further comprising a brake bead.

4. The aircraft brake system as set forth in claim 1, wherein the master ram module is mounted to a brake stack.

5. The aircraft brake system of claim 1, wherein the gearbox is mounted to a brake head.

6. The aircraft brake system of claim 1, wherein the primary flexible force transfer member transfers torque.

7. A aircraft brake system comprising
an aircraft brake disk mounted proximate to a first portion of a strut;
an aircraft brake head;
a plurality of rams mounted on the aircraft brake head positioned to apply braking force to the aircraft brake disk,
an electric motor for actuating the plurality of rams, the electric motor mounted directly on a landing gear well proximate to a second portion of the strut, the first portion of the strut opposite the second portion of the strut when the strut is in a deployed position;
a gearbox comprising a plurality of gears to reduce an input force, wherein the gearbox distributes force equally between each of the plurality of rams, wherein the gearbox transfers a first force from the gearbox directly to a first ram in the plurality of rams;
a first cable connecting the electric motor to the gearbox for transferring the input force from the electric motor to the gearbox, and
a plurality of secondary cables for transferring force from the gearbox to each ram in the plurality of rams other than the first ram, the plurality of secondary cables connecting the gearbox to each ram in the plurality of rams other than the first ram.

8. The aircraft brake system as set forth in claim 7, wherein the aircraft brake disk includes a brake disk stack comprising alternating rotors and stators.

9. The aircraft brake system as set forth in claim 7, wherein the electric motor is shielded from elements.

10. The aircraft brake system as set forth in claim 7, wherein the gearbox is mounted to one of the rams.

11. The aircraft brake system as set forth in claim 7, wherein the plurality of rams are removable and interchangeable.

12. The aircraft brake system of claim 7, wherein the gearbox is mounted to the brake head.

13. The aircraft brake system of claim 7, wherein the primary flexible force transfer member transfers torque.

* * * * *